(12) United States Patent
Ohkohdo et al.

(10) Patent No.: US 6,474,852 B1
(45) Date of Patent: Nov. 5, 2002

(54) SMALL LIGHT-SOURCE MODULE AND LIGHT-SOURCE UNIT

(75) Inventors: Masaya Ohkohdo; Katsuhiro Murahashi; Kouji Tsunoda, all of Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 0 days.

(21) Appl. No.: 09/653,897

(22) Filed: Sep. 1, 2000

(30) Foreign Application Priority Data

Oct. 21, 1999 (JP) .......................................... 11-299971

(51) Int. Cl.⁷ ................................................ B60Q 1/00
(52) U.S. Cl. ........................ 362/487; 362/346; 362/517; 362/297; 362/247; 362/245; 362/301; 362/241; 362/243; 362/238; 362/237
(58) Field of Search ................................. 362/308, 347, 362/350, 517, 518, 522, 245, 327, 237, 238, 241, 243, 247, 297, 346, 301, 302, 800

(56) References Cited

U.S. PATENT DOCUMENTS 1,811,084 A * 6/1931 Holmqvist ................... 362/241
2,636,110 A * 4/1953 Stein ........................ 240/46.19
4,308,573 A * 12/1981 McNamara, Jr. ............ 362/297
4,929,866 A 5/1990 Murata et al.

FOREIGN PATENT DOCUMENTS

| EP | 0 416 253 A2 | 3/1991 |
| EP | 0 886 101 A2 | 12/1998 |
| EP | 0 908 666 A2 | 1/1999 |
| EP | 0 974 485 A2 | 1/2000 |

* cited by examiner

*Primary Examiner*—Stephen Husar
*Assistant Examiner*—Bertrand Zeade
(74) *Attorney, Agent, or Firm*—Foley & Lardner

(57) ABSTRACT

A small light-source module has a module body having a small single-point light source with a limited light-emitting angle mounted thereto, and a reflective surface provided on the module body. The light axis of the light source tilted with respect to the reflective surface, so as to create a substantially fan-shape projected light region on the reflective surface. The outer contour of the reflective surface is also substantially fan-shaped, and the reflective surface has a reflective pattern for reflecting light emitted form the small single-point light source as parallel light.

14 Claims, 5 Drawing Sheets

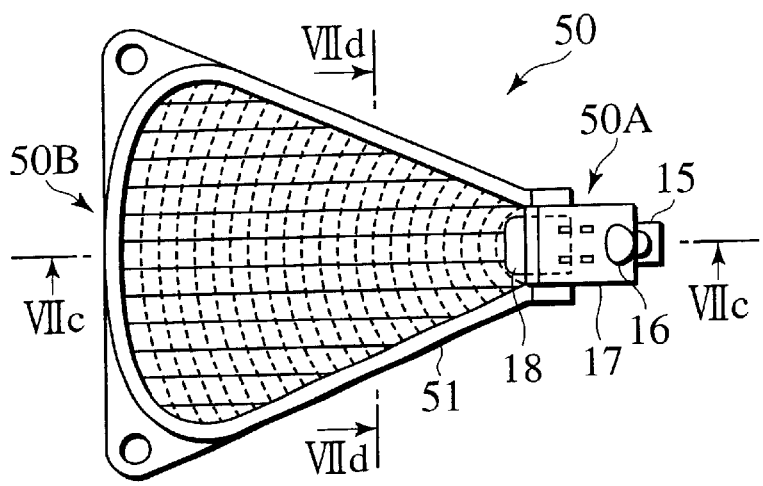
FIG.7A
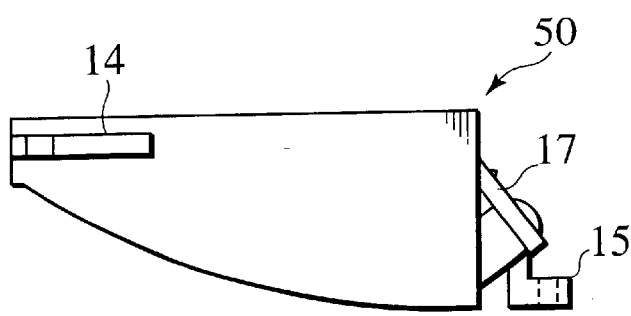
FIG.7B
FIG.7C
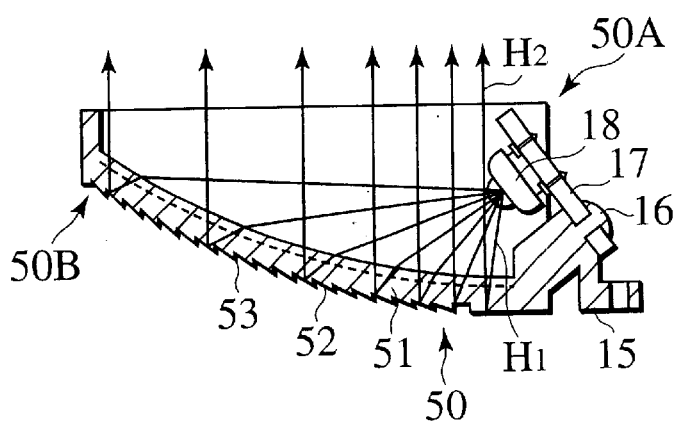
FIG.7D
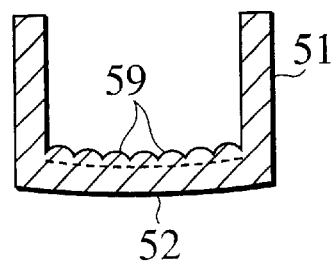

SMALL LIGHT-SOURCE MODULE AND LIGHT-SOURCE UNIT

BACKGROUND OF THE INVENTION

1. Field of the Invention

The present invention relates to a small light-source module to which a small single-point light source such as an LED is mounted as a light source, and to a light-source unit constituted by an arrangement of a plurality of such modules.

2. Related Art

Light-source units using LEDs (light-emitting diode) have come to be used in vehicles as brake lamps. In this application, because the light-emitting angular range of an LED is limited when it is packaged, it is necessary to use a large number of LEDs to approach the condition of a light-emitting surface.

Accordingly, it is an object of the present invention, in consideration of the above-noted condition, to provide a small light-source module capable of emitting light that is close to a surface light source with as large a surface as possible, using one small single-point light source such as an LED having a limited light-emitting angular range, and to provide a light-source unit that, by using such a small light-source module, is capable of providing surface light emission with a large surface area, while using only a small number of light sources.

SUMMARY OF THE INVENTION

To achieve the above-noted objects, a first aspect of the present invention is a small light-source module having a small single-point light source emitting light over a prescribed light-emitting angular range and a reflective surface, the small single-point light source having a light axis that is tilted with respect to the reflective surface, and the outer contour of the reflective surface being substantially fan-shaped, so as to correspond to a projected light region produced on the reflective surface by the small single-point light source, the fan-shaped reflective surface being provided on the body of a substantially fan-shaped module, the small single-point light source being mounted to the module body, and the reflective surface having thereon a reflective pattern that reflects the light emitted from the small single-point light source as parallel light.

By causing the light from the small single-point light source to strike the reflective surface at an inclination thereto, the light is reflected over a large fan-shaped surface. Therefore, when using a small single-point light source such as an LED having a limited light-emitting angular range as a light source, it is possible to produce a condition that is close to surface light emission over as large the maximum surface area possible, thereby enabling a reduction of the number of light sources with respect to the light-emitting surface area. Furthermore, because it is possible to impart a certain directivity while broadening the light-emitting surface, this arrangement is suitable for use in brake lamps for vehicles, for example.

A second aspect of the present invention is a variation on the first aspect, wherein the small single-point light source is provided on an inside surface of the module body, and wherein the reflective surface is integrally provided in an inner surface of the module body, the reflective pattern being provided as a surface pattern on the inner surface of the module body.

In this aspect of the present invention, because the reflective surface is provided on the inner surface of the module body, this arrangement is suitable for the case in which the module body is made of a transparent material. Furthermore, because the reflective pattern is provided as a surface pattern integral to the inner surface of the module body, the task of making the pattern separately and then affixing thereto.

A third aspect of the present invention is a variation on the first aspect, wherein the small single-point light source is provided on an inner surface of the module body, the reflective surface is provided on an outer surface of the module body, which is made of a transparent material, and the reflective pattern is integrally formed in an outer surface of the module body.

The module of the third aspect is made when the module body is made of a transparent material, in which case because the reflective pattern is integrally formed in the outer surface of the module body, it is possible to provide a lens or the like on the inner surface. Additionally, by providing the reflective pattern on the outer surface, processing is facilitated.

A fourth aspect of the present invention is a variation on the third aspect, wherein an array of small lenses is provided on the inner surface of the module body.

Because the module has an array of small lenses on the inner surface of the module body, light that reaches the reflective surface and light after reflection can be collected or dispersed by the lenses, thereby enabling the production of a condition that is closer to surface light emission.

A fifth aspect of the present invention is a variation on any one of the first to the fourth aspects, wherein reflective surface comprises a concave curved surface with respect to the small single-point light source, and wherein a reflective pattern is formed that is constituted by a multiple-step parabolic surface for making the reflected light parallel light.

In this module, because the reflective surface is a concave surface, it is possible to capture all the light from the light source, and possible to increase the reflection efficiency. By using a reflective pattern that is a mutliple-step parabolic surface, it is possible to achieve uniform directivity in the reflected light, even with a compact module body.

A sixth aspect of the present invention is a light-source unit having a plurality of light-source modules having disposed therein a small single-point light source according to any one of the first to the fifth aspects arranged in a radial pattern within a plane, so that the narrowed ends of the module bodies thereof face toward the inside of the unit and the opposite broadened ends of the module bodies thereof face toward the outside of the unit, this arrangement being integrally mounted in a round housing.

In this light-source unit, by using small light-source modules having outer shapes that are substantially fan-shaped, and arranging the modules in a radial pattern within a round housing, it is possible to achieve compactness and produce a round surface light emission with a high light intensity.

A seventh aspect of the present invention is a light-source unit having a plurality of light-source modules having disposed therein a small single-point light source according to any one of the first to the fifth aspects arranged in a radial pattern within a plan, so that the narrowed ends of the module bodies thereof face toward the outside of the unit and the opposite broadened ends of the module bodies thereof face toward the inside of the unit, this arrangement being integrally mounted in a round housing.

In this light-source unit, by arranging the substantially fan-shaped modules in a circle with the opposite orientation from the sixth aspect, it is possible to achieve a distinctive design, which when used as a signaling light is highly visible, thereby improving safety.

An eight aspect of the present invention is a light-source unit having a plurality of light-source modules having disposed therein a small single-point light source according to any one of the first to the fifth aspects arranged vertically in a linear pattern, wherein the narrowed ends of the module bodies thereof face in the same transverse direction, this arrangement being integrally mounted in a rectangular housing.

In this light-source unit, by arranging the small light-source modules linearly, a linear design is achieved in which it is possible to produce surface light emission with a large surface area and high light intensity, making the arrangement suitable for such applications as a brake light of a vehicle.

A ninth aspect of the present invention is a light-source unit having a plurality of light-source modules having disposed therein a small single-point light source according to any one of the first to the fifth aspects arranged in a linear pattern, wherein the narrowed ends and the opposite broadened ends of the module bodies thereof alternate in orientation along the linear arrangement, this arrangement being integrally mounted in a rectangular housing.

In this light-source unit, similar to the eight aspect, by arranging the small light-source modules linearly a linear design is achieved in which it is possible to produce a surface light emission condition. Additionally in this aspect, by alternating the orientation of the narrowed and broadened ends of the modules, it is possible to achieve a dense layout of the modules, thereby making this arrangement suitable for use as a high-mounted brake light in a vehicle.

BRIEF DESCRIPTIONS OF THE DRAWING

The above and further objects and novel features of the present invention will more fully appear from the following detailed description when the, same is read in conjunction with the accompanying drawings, in which.

Figure 1A:
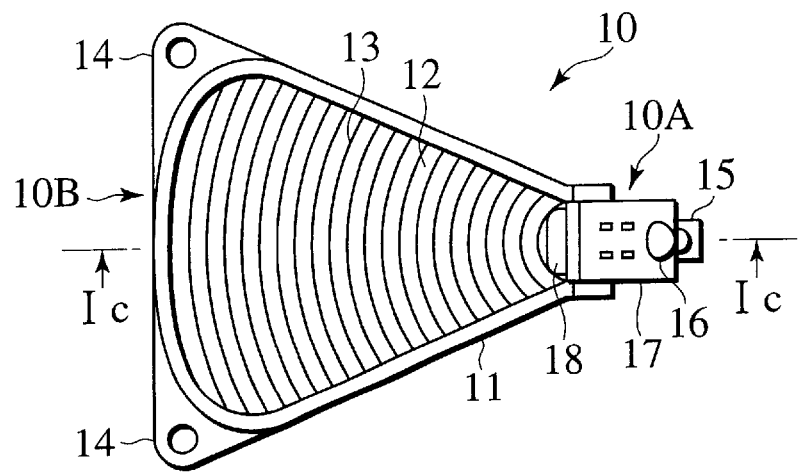
FIGS. 1A, 1B and 1C are drawings showing a small light-source module according to a first embodiment of the present invention, FIG. 1A being a plan view, FIG. 1B being a side elevation, and FIG. 1C being a cross-sectional view along the cutting line Ic—Ic shown in FIG. 1A.
Figure 6:
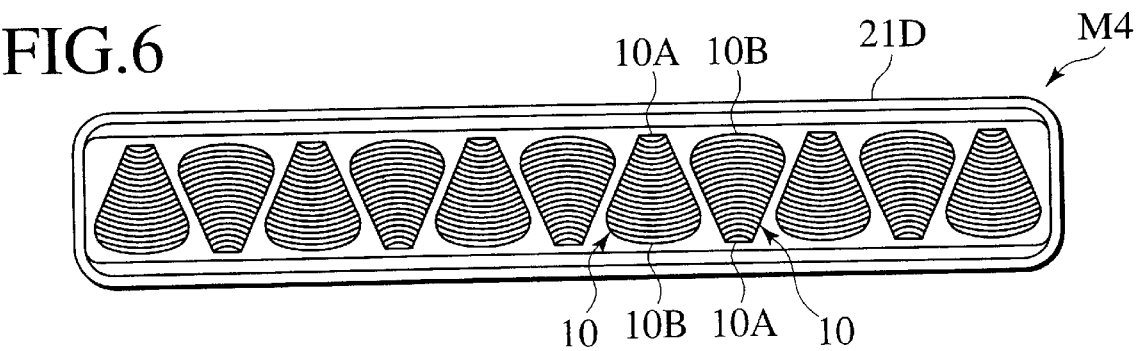

FIG. 6 is a plan view showing a light-source unit according to a fourth embodiment of the present invention; and FIGS. 7A, 7B, 7C and 7D are drawings showing a light-source module according to a fifth embodiment of the present invention, FIG. 7A being a plan view, FIG. 7B being a side elevation, FIG. 7C being a cross-sectional view along the cutting line VIIc—VIIc shown in FIG. 1A, and FIG. 7D being a cross-sectional view along the cutting line VIId—VIId shown in FIG. 7A.

DESCRIPTION OF THE PREFERRED EMBODIMENTS

Embodiments of the present invention are describe in detail below, with references made to relevant accompanying drawings.

Figure 1B:
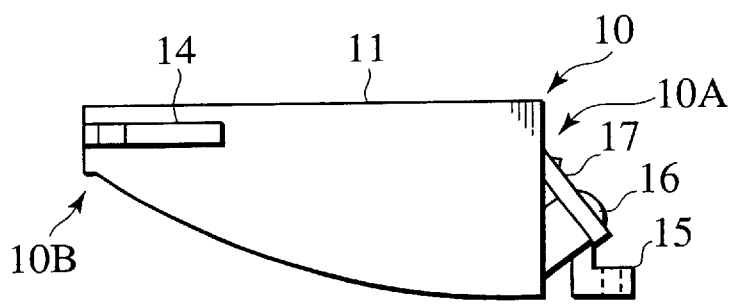
Figure 1C:
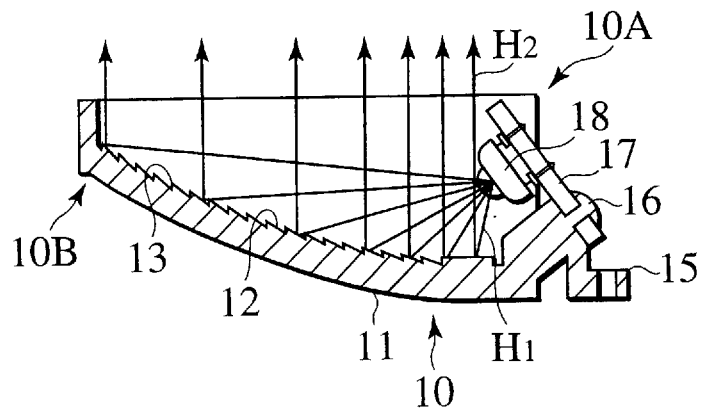

FIGS. 1A, 1B and 1C show the configuration of a small light-source module according to a first embodiment of the present invention, in which one LED 18 is a small single-point light source that is mounted as a light source to a module body 11.

The module body 11 has the shape of a shallow shell, the inner bottom surface of which is a concave curved surface with a downward slant from the broadened end 10B to the narrowed end 10A of a fan shape, wherein a substantially fan-shaped reflective surface 12 is provided on the concave curved inner bottom surface so as to correspond to the shape of the module body 11. The LED 18, which emits a light H1 toward the reflective surface 12 over a prescribed angular range θ2 (FIG. 2B) about a later-described light axis 4, is provided on the narrowed end 10A of the module. An LED mounting part 16 is provided on the narrowed end 10A of the module body 11, the LED 18 being mounted thereto via an intervening bracket 17.

The reason for making the module 11 fan-shaped is described below, with reference to FIGS. 2A and 2B.

Figure 2A:
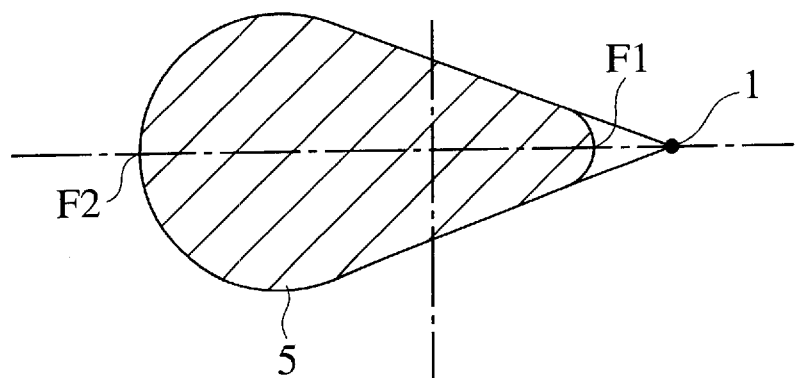
FIGS. 2A and 2B are drawings showing the conceptual configuration of an embodiment of the present invention, FIG. 2A being a plan view, and FIG. 2B being a side elevation.
Figure 2B:
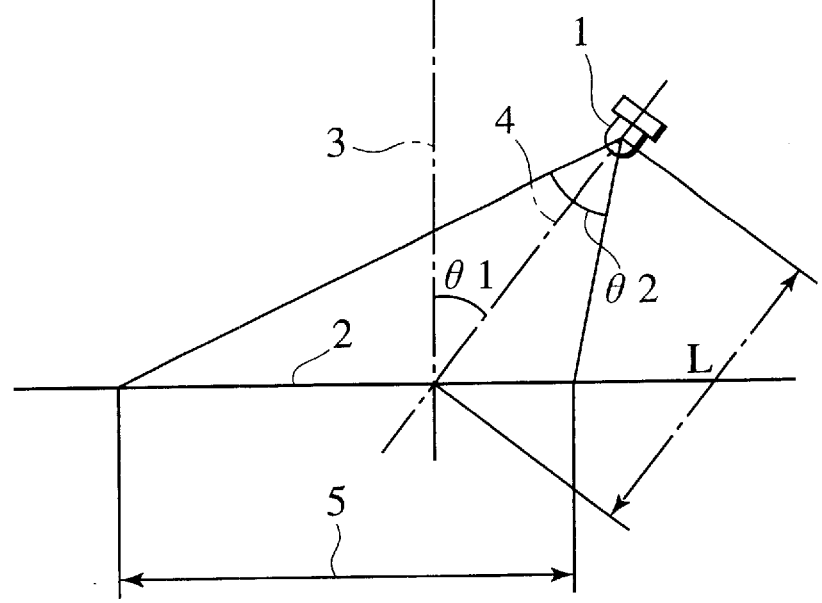

In FIGS. 2A and 2B, the reference numeral 1 denotes an LED (see e.g., LED 18), 2 is a reflective surface (see also reflective surface 12), 3 is a line normal to the reflective surface 2, 4 is a light axis as an optical axis of the LED 18, 5 is a projected light region that the LED 18 has, on the module body 11, as an irradiation region, θ1 is the tilt of the light axis 4 with respect to the normal line 3, θ2 is the light-emitting angle of the LED 18, F1 denotes the narrow end of the emission, F2 denotes the wide end of the emission, and L is the distance between the reflective surface 2 and the LED 18.

If the light from the LED 18 is caused to strike the reflective surface 2 head-on (that is, if θ1=0), the pattern of projected light will be round. If, however, the light axis is tilted (that is, if θ1 is not 0), the projected light region 5, as shown in the drawing, will be a shape that is close to that of a fan, and the projected light surface area will increase.

Given the above, the reason that the module 10 is made fan-shaped is to achieve the best efficiency in extracting the reflected light over as wide a surface area as possible, by matching the outer contour shape of the reflective surface to the substantially fan-shaped projected light region 5.

Because by merely making the reflective surface fan-shaped and tilting the light, however, the light would scatter, in the module 10 shown in FIG. 1A, a multiple-step parabolic surface is formed as a reflection pattern or reflective pattern 13 in terms of a pattern for arrangement of reflective elements to provide an intended distribution of reflected light H2, so that the light H1 from the LED 1 is reflected as parallel light H2. In this case, the reflective pattern 13 is integrally formed in the module body 11, and a metallic reflective film is formed thereonto, thereby forming the reflective surface 12 having the reflective pattern 13.

Mounting tabs 14 and 15 for the broadened end 10B and the narrowed end 10A, respectively, are provided on the outer surface of the module body 11.

According to a small light-source module 10 configured in this manner, it is possible to reflect the light from the LED 18, which has a limited light-emission angle, in a condition close to surface light emission, over the maximum surface area possible. Furthermore, it is possible to impart a degree of directionality, while broadening the light-emitting surface. By using a fan shape, it is possible to lay out a large number of the modules within a plane, thereby enabling production of light-source units having various light-emitting patterns.

Figure 3A:
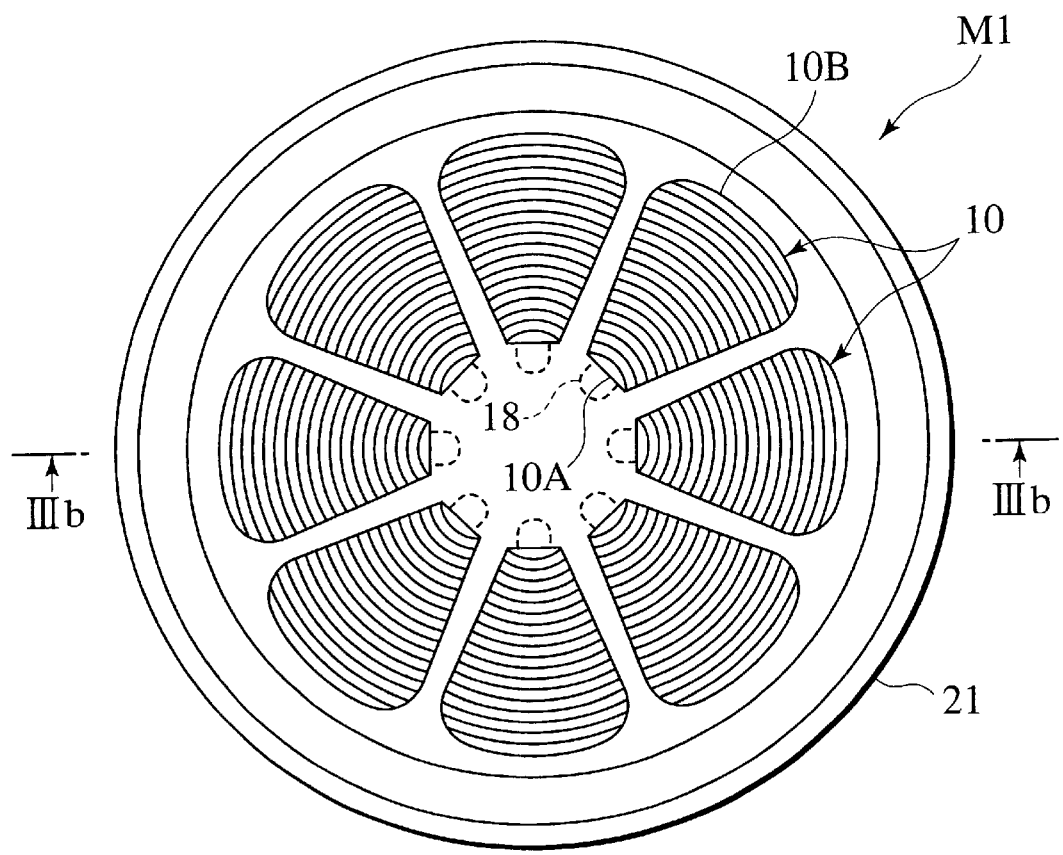
FIGS. 3A and 3B are drawings showing a light-source unit according to the first embodiment of the present invention, FIG. 3A being a plan view, and FIG. 3B being a cross-sectional view along the cutting line IIIb—IIIb shown in FIG. 1A.
Figure 3B:
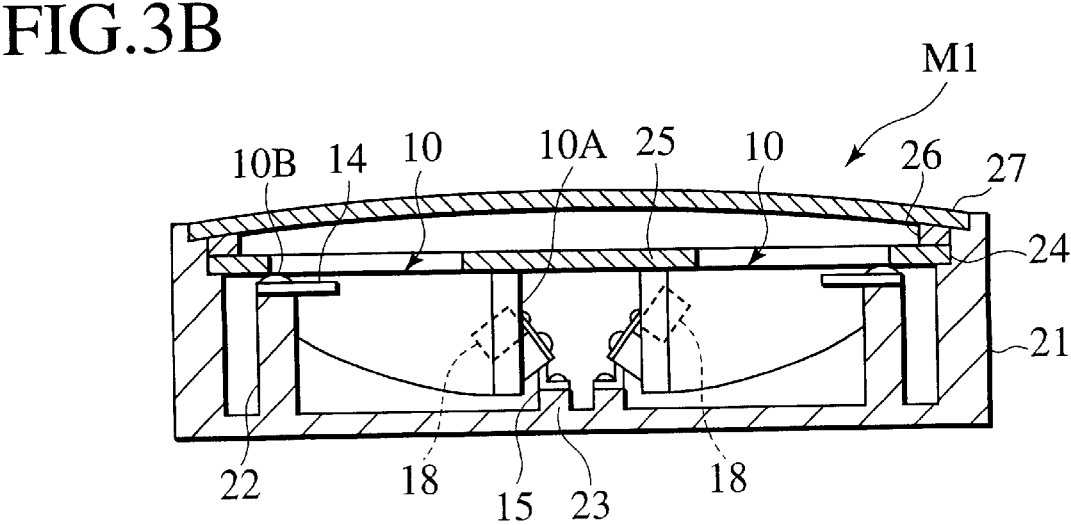

FIGS. 3A and 3B show a light-source unit M1 of the first embodiment fabricated using the above-noted module 10. The light-source unit M1 shown in FIG. 3A has a plurality of small light-source modules 10 arranged radially in a plane, with the narrowed ends 10A thereof having the LED 18 facing the inside (center) of the unit, and the opposite broadened ends 10B facing the outside (periphery) of the unit, this arrangement being integrally mounted to a round housing 21.

In this configuration, with fan-shaped modules, it is possible to dispose the modules 10 close together, thereby achieving surface light emission with high intensity.

As shown in FIG. 3B, bosses 22 and 23 are provided so as to protrude concentrically form the inner bottom part of the round receptacle housing 21, and the mounting tabs 14 and 15 are screwed to these bosses 22 and 23 so as to mount and arrange the modules 10 along the periphery. In FIG. 3B, the reference numeral 25 denotes an inner panel supported by an annular step 24 formed along the inner periphery of the opening of the housing 21, and 26 denotes a spacer inserted between an outer lens 27 and the inner panel 25.

It is possible to combine modules 10 in a variety of other forms.

Figure 4:
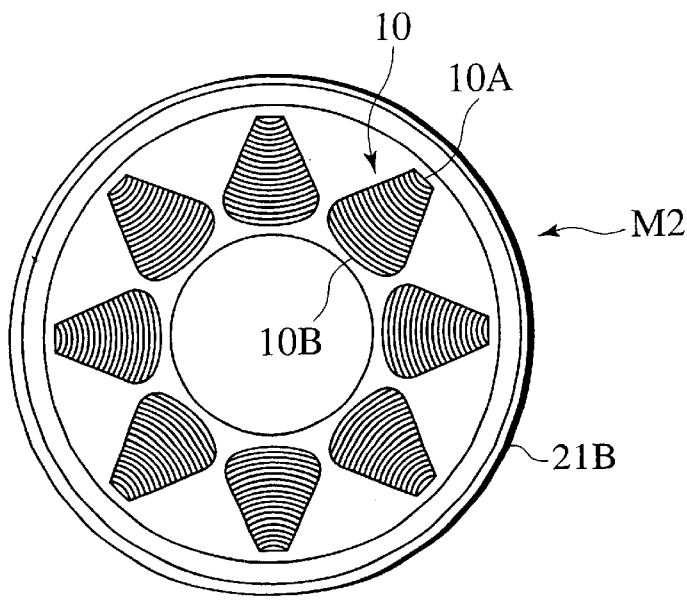
FIG. 4 is a plan view showing a light-source unit according to a second embodiment of the present invention.

For example, a light-source unit M2 according to a second embodiment shown in FIG. 4 has an arrangement of modules 10 that is the opposite of that shown in FIG. 3A. That is, the plurality of modules 10 are arranged radially in a plane in a round housing 21B, with the narrowed ends 10A thereof facing the outside and the broadened ends 10B facing the inside, this arrangement being integrally mounted in the round housing 21B.

According to this light-source unit M2, by adopting an orientation of fan-shaped modules 10 that is opposite that of the earlier-described arrangement, it is possible to produce a distinctive light emission design.

Figure 5:
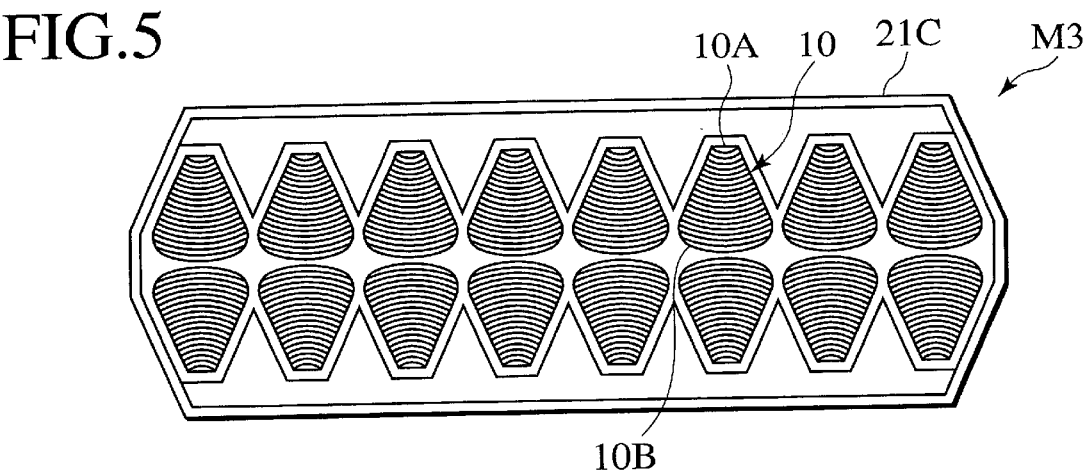
FIG. 5 is a plan view showing a light-source unit according to a third embodiment of the present invention.

In a light-source unit M3 according to a third embodiment of the present invention, shown in FIG. 5, modules 10 are arranged linearly in a vertical direction, with the narrowed ends 10A thereof facing in the same transverse direction, this arrangement being integrally mounted in a rectangular housing 21C.

In an light-source unit M4 according to a fourth embodiment of the present invention, modules 10 are arranged linearly in a vertical direction, with the orientation of the narrowed ends 10A and the broadened ends 10B thereof alternating, this arrangement being integrally mounted in a rectangular housing 21D.

The light-source units M3 and M4 use linear arrangements of the modules 10, thereby enabling production of surface light emission with a linearly arranged design. In particular in the case of the light-source unit of FIG. 6, it is possible to achieve a dense layout of the modules 10, thereby enabling surface light emission with a high intensity.

FIGS. 7A, 7B, 7C and 7D show a small light-source module 50 according to a fifth embodiment of the present invention.

Whereas the module 10 described above, assuming a module body 11 made of a transparent material, has a reflective surface 12 formed on the inner bottom surface of the module body 11, in the module 50 according to the fifth embodiment, a module body 51 is formed by a transparent resin, and a reflective surface 52 is formed on the outer bottom surface of the module body 51, and a reflective pattern 53 is integrally formed on the outer bottom surface as a multiple-step parabolic surface. Small lenses 59 are formed in an array on the inner bottom surface opposite the LED 18.

The module 50, by integrally forming a reflective surface 53 on the outer bottom surface of the module body 51, enables the provision of an array of small lenses 59 on the inner bottom surface. Therefore, light reaching the reflective surface 52 or light after reflection can be collected or dispersed by the small lenses 59, enabling the production of a condition that is closer to surface light emission. Additionally, because the reflective pattern 53 is on the outer surface, it provides the advantage of facilitating processing.

In the case of the small light-source module 50 as well, by appropriately arranging the positioning of the narrowed ends 50A and the broadened ends 50B of the module 50, it is possible to fabricate various light-source units such as shown in FIG. 3A to FIG. 6.

What is claimed is:

1. A light source unit comprising a set of arranged small light-source modules, wherein a respective light-source module comprises:

a point light source having a defined light emission angle range about an optical axis thereof; and a module body having a reflective surface formed thereon with a reflection pattern for reflecting light received from the point light source to project parallel light, wherein;

the point light source is mounted to the module body with the optical axis tilted to the reflective surface, to have a light irradiation region substantially fan-shaped on the reflective surface; and the reflective surface has a contour substantially fan-shaped in correspondence to the light irradiation region.

2. A light source unit according to claim 1, wherein the point light source and the reflective pattern are disposed at an identical side of the module body.

3. A light source unit according to claim 1, wherein the module body is transparent, and the point light source and the reflective surface are disposed at opposite sides of the module body.

4. A light source unit according to claim 3, wherein the module body has an array of lens elements formed on an opposite side thereof to the reflective surface.

5. A light source unit according to claim 1, wherein the reflective surface is concave with respect to the point light source, and is formed with the reflective pattern comprised of a multiple-step parabolic surface.

6. A light source unit according to claim 1, comprising: a housing configured in a round form; and the set of small light-source modules radially arranged in the housing, with the respective light-source module having a narrowed end thereof provided with the point light source and directed to a center of the housing, and an opposite broadened end thereof directed to an outer periphery of the housing.

7. A light source unit according to claim 1, comprising: a housing configured in a round form; and the set of small light-source modules radially arranged in the housing, with the respective light-source module having a narrowed end thereof provided with the point light source and directed to an outer periphery of the housing, and an opposite broadened end thereof directed to a center of the housing.

8. A light source unit according to claim 1, comprising:

a housing; and the set of small light-source modules being linearly arrayed in the housing, with the respective light-source module having a narrowed end thereof provided with the point light source and oriented in an identical sense to a narrowed end of a neighboring light-source module.

9. A light source unit according to claim 1, comprising:

a housing; and the set of small light-source modules being linearly arrayed in the housing, with the respective light-source module having a narrowed end thereof provided with the light source and oriented in an identical sense to a broadened end of a neighboring light-source module.

10. A small light-source module, comprising:

a point light source having a defined light emission angle range about an optical axis thereof; and a module body having a reflective surface formed thereon with a reflection pattern for reflecting light received from the point light source to project parallel light, wherein the point light source is mounted to the module body, with the optical axis tilted to the reflective surface, to have a light irradiation region substantially fan-shaped on the reflective surface, and the reflective surface has a contour substantially fan-shaped in correspondence to the light irradiation region.

11. A small light-source module according to claim 10, wherein the point light source and the reflective pattern are disposed at an identical side of the module body.

12. A small light-source module according to claim 10, wherein the module body is transparent, and the point light source and the reflective surface are disposed at opposite sides of the module body.

13. A small light-source module according to claim 12, wherein the module body has an array of lens elements formed on an opposite side thereof to the reflective surface.

14. A small light-source module according to claim 10, wherein the reflective surface is concave with respect to the point light source, and formed with the reflective pattern comprised of a multiple-step parabolic surface.

\* \* \* \* \*